UNITED STATES PATENT OFFICE.

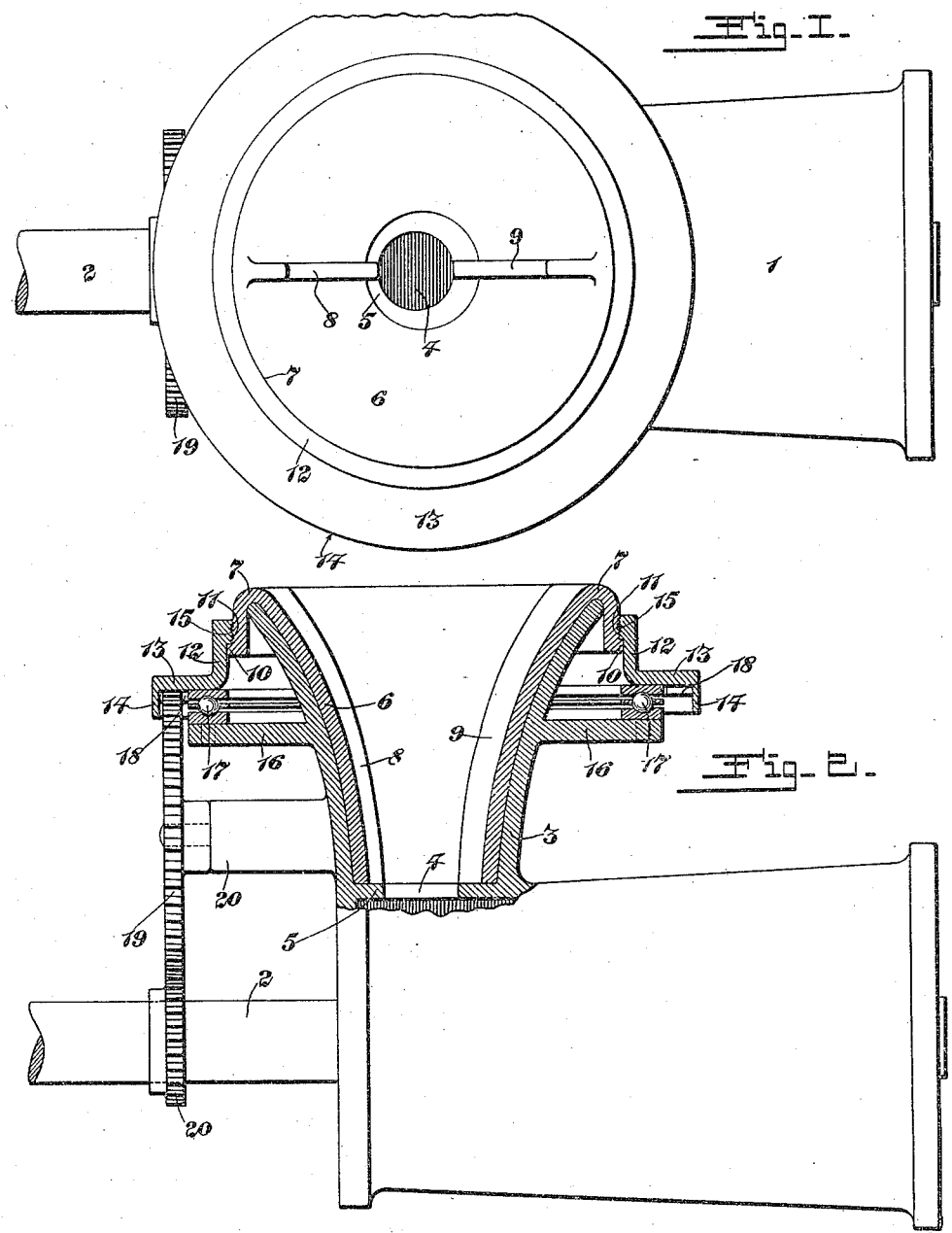

RICHARD OEHLER, OF ST. LOUIS, MISSOURI.

MEAT-GRINDER.

1,296,108.

Specification of Letters Patent.

Patented Mar. 4, 1919.

Application filed August 12, 1918. Serial No. 249,453.

*To all whom it may concern:*

Be it known that I, RICHARD OEHLER, a citizen of the United States, residing in the city of St. Louis and State of Missouri, have invented a new and useful Meat-Grinder, of which the following is a specification.

This invention relates to improvements in meat grinders, and more particularly to a feeding device for automatically feeding the meat to the grinding chamber. Heretofore in meat grinder construction the meat has been fed to the grinding chamber by placing the same in a hopper from which it is fed by gravity into the grinding chamber. In the ordinary feeding operation of grinders of this type it is necessary to exert pressure upon the contents of the hopper in order to obtain a uniform feed of the meat from the hopper into the grinder chamber as the meat packs in such a way as to prevent the proper discharge from the hopper.

An object of the invention is to equip meat grinders with an agitating device insertible into the hopper of the grinder which is effective to agitate the meat in such a manner as to cause a continuous feed into the grinder chamber.

Another object of the invention is to provide a feeding device for meat grinders comprising a rotatable bowl with convenient mounting therefor, in combination with driving mechanism for rotating the bowl effectively to discharge meat placed therein into the grinder chamber of the machine.

With the foregoing as well as additional objects attainable from the construction in view, I have designed, arranged and combined the parts hereinafter described, reference being made to the accompanying drawing, in which—

Figure 1 is a plan view of a meat grinder equipped with an improved form of meat feeding device.

Fig. 2 is an elevation of the machine partially in section disclosing in further detail the construction.

In the embodiment of the invention illustrated in the drawing, the feeding device is shown as applied to a meat grinder of usual construction, which comprises a grinding chamber 1, which it will be understood incloses the usual grinding knives or worm which is actuated by a power shaft 2. Formed in connection with the grinder case is a hopper shell 3, there being an opening 4 at the bottom of the hopper shell into the grinder chamber. At the base of the hopper shell 3 and surrounding the opening 4 is a horizontal flange 5.

The agitating bowl is fitted within the hopper shell and comprises a bell-shaped wall 6 with an overturned flange 7 at the upper edge thereof. This bowl fits over the top edge of the hopper shell and contacts with the inner surface thereof. Within the bowl are formed inwardly extending flanges or ribs 8 and 9, said ribs being of unequal width so that when the bowl is rotated they will contact with the sides of the mass of meat packed into the bowl, agitating it sufficiently to cause it to feed by gravity through the opening 4 into the grinder chamber without additional pressure on the top of the mass. The base of the flange 7 is formed with a shoulder 10 and the side walls thereof are threaded at 11 above the shoulder.

A collar having a vertical wall 12, a horizontal extension 13 and an overhanging flange 14 is connected with the edges of the bowl by thread connection 15, so that it may be readily removed therefrom, permitting the bowl to be lifted out of the hopper shell for the purposes of cleaning the same, it being understood that the threaded connection between the hopper bowl and the collar is arranged so that the parts will not be separated when the bowl is rotated by the driving mechanism.

Extending outwardly from the outer edges of the hopper shell is an annular flange 16 which constitutes a support for a roller bearing 17, the horizontal portion of the collar being arranged to rest upon the upper surface of the bearing, thereby supporting the bowl and permitting it to be rotated without an excessive amount of friction.

A gear 18 is formed on the under face of the horizontal section 11 of the collar, said gear being meshed with a gear 19 revolubly mounted in a support 20 extending outwardly from the hopper shell. The gear 19 is driven from a pinion 20 mounted upon the main drive shaft of the grinder. This construction provides a speed reducing driving mechanism so that the hopper bowl may be operated at a reduced speed from the main source of power for actuating the grinder.

As the hopper bowl is supported by the roller bearing construction and is designed to be fitted closely against the hopper shell and supported at its lower edge by the flange 5, it may be rotated with a small amount of power.

The meat is placed in the hopper bowl which is revolved when the machine is set in operation. The rotation of the bowl agitates the mass of meat sufficiently to permit it to be automatically delivered from the hopper bowl through the opening 4 into the grinder chamber. As the delivery of the meat is automatic it is unnecessary for the operator to place his hands upon the mass of meat or to force it into the grinder chamber by an implement, thereby avoiding the possibility of an accident to the operator or the likelihood of a part of the implement entering the grinding chamber and thereby damaging the operating parts of the grinder.

I am aware that the invention may be modified in certain details without departure from the spirit and scope of the invention. I do not limit myself therefore to the exact details, but what I claim and desire to secure by Letters Patent, is:—

1. A meat grinder, comprising a grinding chamber, a hopper supported by the chamber and having an opening communicating with the interior of the chamber, a bowl revolubly supported within the hopper, a shaft supported by the chamber, and gearing for revolving said hopper from said shaft.

2. A grinder, comprising a grinding chamber, a hopper supported by the chamber having an opening for delivering material into the chamber, a bowl revolubly supported within the hopper, a collar in connection with the bowl outside of the hopper, a rack in connection with said collar, a gear meshing with said rack, a driving shaft supported by the chamber, and a pinion on the driving shaft meshing with said gear whereby the said bowl will be rotated by said shaft.

3. A grinder, comprising a grinding chamber, a hopper supported by the chamber having an opening for delivering material into the chamber, a flange around said opening, a bowl revolubly mounted within the hopper having its lower end bearing upon said flange, flanges on the inner side of said bowl for agitating the material within the bowl as the bowl is rotated, a drive shaft supported by the chamber, and means for rotating said bowl by said drive shaft.

4. A grinder, comprising a grinding chamber, a hopper supported by the grinding chamber having an opening for delivering material into the chamber, a bowl revolubly supported within the hopper, flanges on said bowl for agitating the material therein as the bowl is rotated, a drive shaft supported by the grinding chamber, and gearing driven by the drive shaft for revolving said hopper as the drive shaft is rotated.

5. A grinder, comprising a grinding chamber, a hopper supported by the chamber and having an opening for discharging material into the chamber, a bowl revolubly supported within the hopper, flanges on the bowl for agitating the material therein as the bowl is rotated, an annular rack in connection with the bowl outside of the hopper, a drive shaft supported by the chamber, and gearing connecting said drive shaft and said rack for rotating the bowl as the drive shaft is rotated.

RICHARD OEHLER.

Copies of this patent may be obtained for five cents each, by addressing the "Commissioner of Patents, Washington, D. C."